United States Patent

Brady et al.

[11] Patent Number: 5,940,612
[45] Date of Patent: Aug. 17, 1999

[54] SYSTEM AND METHOD FOR QUEUING OF TASKS IN A MULTIPROCESSING SYSTEM

[75] Inventors: James Thomas Brady; Damon W. Finney, both of San Jose, Calif.; Michael Howard Hartung, Tucson, Ariz.; Michael Anthony Ko, San Jose, Calif.; Noah R. Mendelsohn, Lexington, Mass.; Jaishankar Moothedath Menon, San Jose; David R. Nowlen, Morgan Hill, both of Calif.

[73] Assignee: International Business Machines Corporation, Armonk, N.Y.

[21] Appl. No.: 08/534,585

[22] Filed: Sep. 27, 1995

[51] Int. Cl.⁶ ....................................................... G06F 9/00
[52] U.S. Cl. .............................................. 395/673; 395/672
[58] Field of Search .................................... 395/673, 208, 395/182.17, 373, 672, 670, 200

[56] References Cited

U.S. PATENT DOCUMENTS

| | | |
|---|---|---|
| 4,177,513 | 12/1979 | Hoffman et al. . |
| 4,286,322 | 8/1981 | Hoffman et al. . |
| 4,358,829 | 11/1982 | Branigin et al. . |
| 4,539,637 | 9/1985 | DeBruler . |
| 4,658,351 | 4/1987 | Teng ......................................... 395/673 |
| 4,660,168 | 4/1987 | Grant et al. ................................. 705/8 |
| 4,682,284 | 7/1987 | Schrofer . |
| 4,868,744 | 9/1989 | Reinsch et al. ..................... 395/182.17 |
| 4,914,570 | 4/1990 | Peacock . |
| 4,980,824 | 12/1990 | Tulpule et al. . |
| 5,012,409 | 4/1991 | Fletcher et al. . |
| 5,202,988 | 4/1993 | Spix et al. . |
| 5,220,653 | 6/1993 | Miro . |
| 5,247,675 | 9/1993 | Farrell et al. . |

OTHER PUBLICATIONS

"Operating System Concept"; J. Peterson & A. Silberschatz, Adison–Wesley, 1983.
"Digital Circuits and Micro Processors", Herbert Taub, McGraw Hill, 1982.
"DEC OSF/1", Digital Equipment Corp., Feb. 1994 pp. 70, 267–275.

Primary Examiner—Majid A. Banankhah
Attorney, Agent, or Firm—Ohlandt, Greeley, Ruggiero & Perle

[57] ABSTRACT

A procedure controls execution of priority ordered tasks in a multi-nodel data processing system. The data processing system includes a node with a software-controlled processor and a hardware-configured queue-controller. The queue-controller includes a plurality of priority-ordered queues, each queue listing tasks having an assigned priority equal to a priority order assigned to the queue. The queue-controller responds to a processor generated order to queue a first task for execution, by performing a method which includes the steps of: listing said first task on a first queue having an assigned priority that is equal to a priority of said first task; if a second task is listed on a queue having a higher assigned priority, attempting execution of the second task before execution of the first task; if no tasks are listed on a queue having a higher assigned priority than said first queue, attempting execution of a first listed task in the first queue means; and upon completion of execution of the task or a stalling of execution of the task, attempting execution of a further task on the first queue only if another order has not been issued to place a task on a queue having a higher assigned priority. The method further handles chained subtasks by attempting execution of each subtask of a task in response to the processor generated order; and if execution of any subtask does not complete, attempting execution of another task in lieu of a subtask chained to the subtask that did not complete.

5 Claims, 13 Drawing Sheets

ADD OCB TO CHAIN

DATA BUFFER INTERFACE

CONTROL MESSAGE

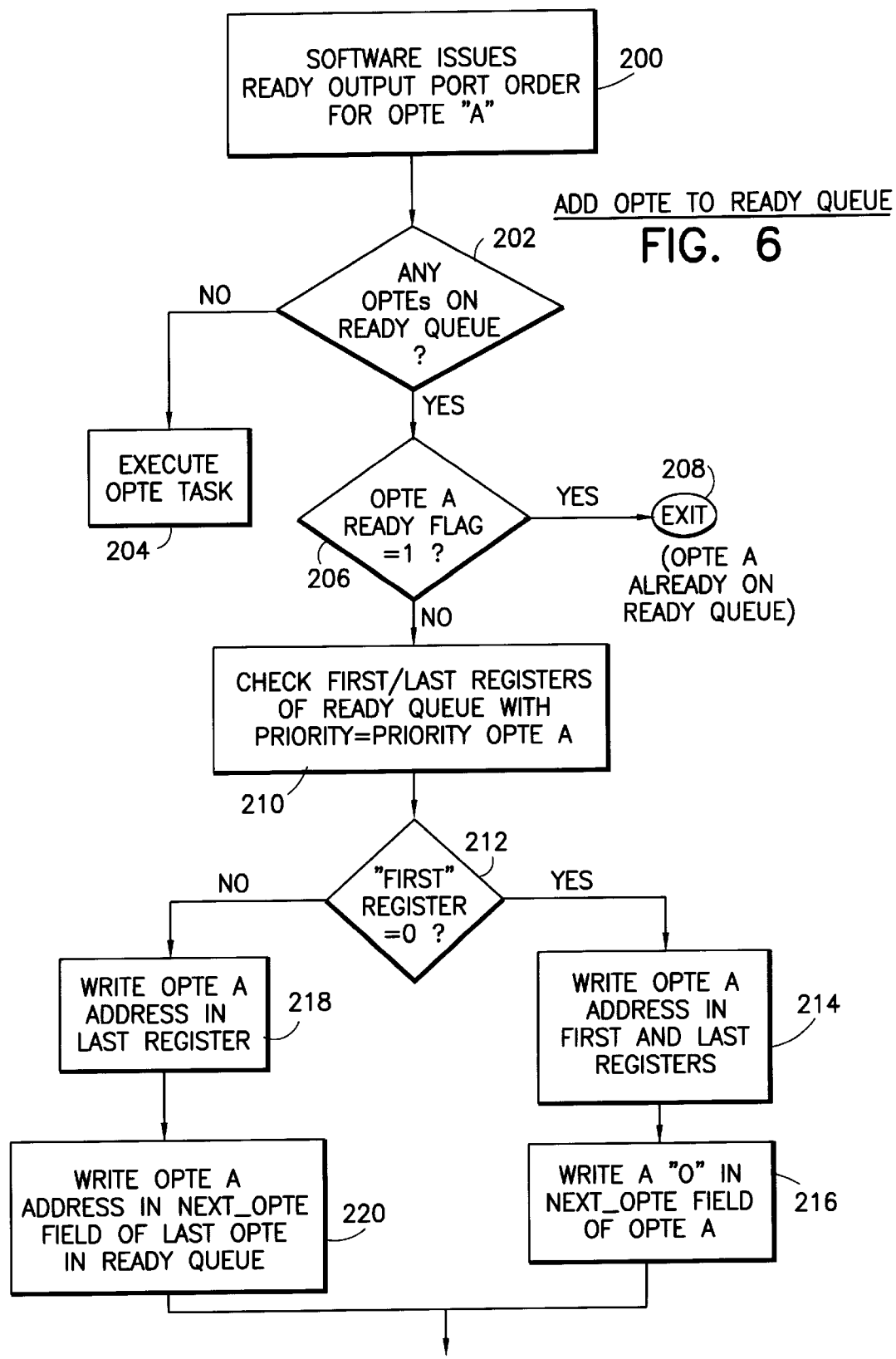

ADD OCB TO CHAIN

5,940,612

SYSTEM AND METHOD FOR QUEUING OF TASKS IN A MULTIPROCESSING SYSTEM

FIELD OF THE INVENTION

This invention relates to a method and apparatus for controlling of a computer to dispatch tasks that are ready for execution and, more particularly, to a method and system for handling dispatch of tasks from the computer's ready queues with a minimum of software intervention.

BACKGROUND OF THE INVENTION

As computers are required to process more tasks simultaneously, the processing overhead for handling such tasks grows. Today, computers employ software processes to decide which tasks will be performed and when they will be performed. When one task completes (or is found to be unable to complete due to an error or a lack of resources), software is notified via an interrupt procedure and the software must then decide upon a next action to be taken. While the interrupt is being processed by the computer, the system may be idle while it waits for new work to be assigned. Once the new task is assigned, it is the responsibility of a task dispatch mechanism to determine when the task will be released for execution. Many such task dispatching systems are required to handle tasks of varying priority and assure that higher priority tasks are executed before lower priority tasks. This function is usually accomplished by software terminating an active task, followed by starting a new higher priority task. In such cases, software is required to interrupt the current task, start the higher priority task and eventually restart the interrupted task. This action may require a number of interrupts to the processor to allow software to handle the task switching. The time required to process these interrupts can create a bottleneck to overall system performance and can become a particularly serious problem in a real time system.

Task dispatching systems are also required to handle situations where a task is running, but additional work is generated which is required to be added to the running task. One of two methods are usually employed to implement such a work addition. The first method requires that a task not be started until it is completely assembled and once the task has commenced execution, no additional work can be added. The other method involves temporarily suspending the execution of the task so that new work may be added. Both methods require that the task execution be delayed, either at the start or during operation, to allow the task to be updated with the additional work.

To enable a task dispatching mechanism to operate in an efficient manner, the prior art has queued tasks for execution into a run list, with the tasks then being executed on an assigned priority basis. To avoid software intervention, the IBM System 370 employed a "1 deep" queue in its task dispatching mechanism. In essence, a logical control block, employed to commence a task dispatch action, was staged immediately after a prior task's control block had been dispatched. Under such conditions, the staged task control block was immediately available upon either completion or stalling of the dispatched prior task.

With the onset of multi-nodal data processing systems, where the nodes are independent processors and operate in parallel to perform a data processing action, it has become increasingly important to enable task dispatch actions to occur with as little software intervention as possible. To assure efficient operation of such multi-nodal data processing systems, the system architecture must assure that overall control is distributed so that no single failure of a node will cause the system to "crash". Of necessity, such a distributed architecture requires substantial levels of data communications between nodes. Unless such data communications are handled in a manner to avoid unnecessary loading of the nodal processors, overall data processing effectiveness of the multi-nodal system suffers.

Accordingly, it is an object of this invention to provide an improved task dispatching method and apparatus for a data processing system.

It is another object of this invention to provide an improved task dispatching method and apparatus which minimizes software and central processor involvement in task dispatching procedures.

It is yet another object of this invention to provide an improved task dispatching method and apparatus which enables units of work to be added to a task being executed without requiring implementation of execution delays.

It is still another object of this invention to provide an improved task dispatching method and apparatus which assures that a highest priority queued task is first executed.

SUMMARY OF THE INVENTION

A procedure controls execution of priority ordered tasks in a multi-nodel data processing system. The data processing system includes a node with a software-controlled processor and a hardware-configured queue-controller. The queue-controller includes a plurality of priority-ordered queues, each queue listing tasks having an assigned priority equal to a priority order assigned to the queue. The queue-controller responds to a processor generated order to queue a first task for execution, by performing a method which includes the steps of: listing said first task on a first queue having an assigned priority that is equal to a priority of said first task; if a second task is listed on a queue having a higher assigned priority, attempting execution of the second task before execution of the first task; if no tasks are listed on a queue having a higher assigned priority than said first queue, attempting execution of a first listed task in the first queue means; and upon completion of execution of the task or a stalling of execution of the task, attempting execution of a further task on the first queue only if another order has not been issued to place a task on a queue having a higher assigned priority. The method further handles chained subtasks by attempting execution of each subtask of a task in response to the processor generated order; and if execution of any subtask does not complete, attempting execution of another task in lieu of a subtask chained to the subtask that did not complete.

DESCRIPTION OF THE DRAWINGS

FIG. 3b is a schematic of plural priority queue register structures contained in an output port state logic block shown in FIG. 3a.

FIGS. 6–8 comprise a logic flow diagram which illustrates the handling of tasks within either the control memory interface block or the data buffer interface block of FIG. 2.

DETAILED DESCRIPTION OF THE INVENTION

Figure 1:
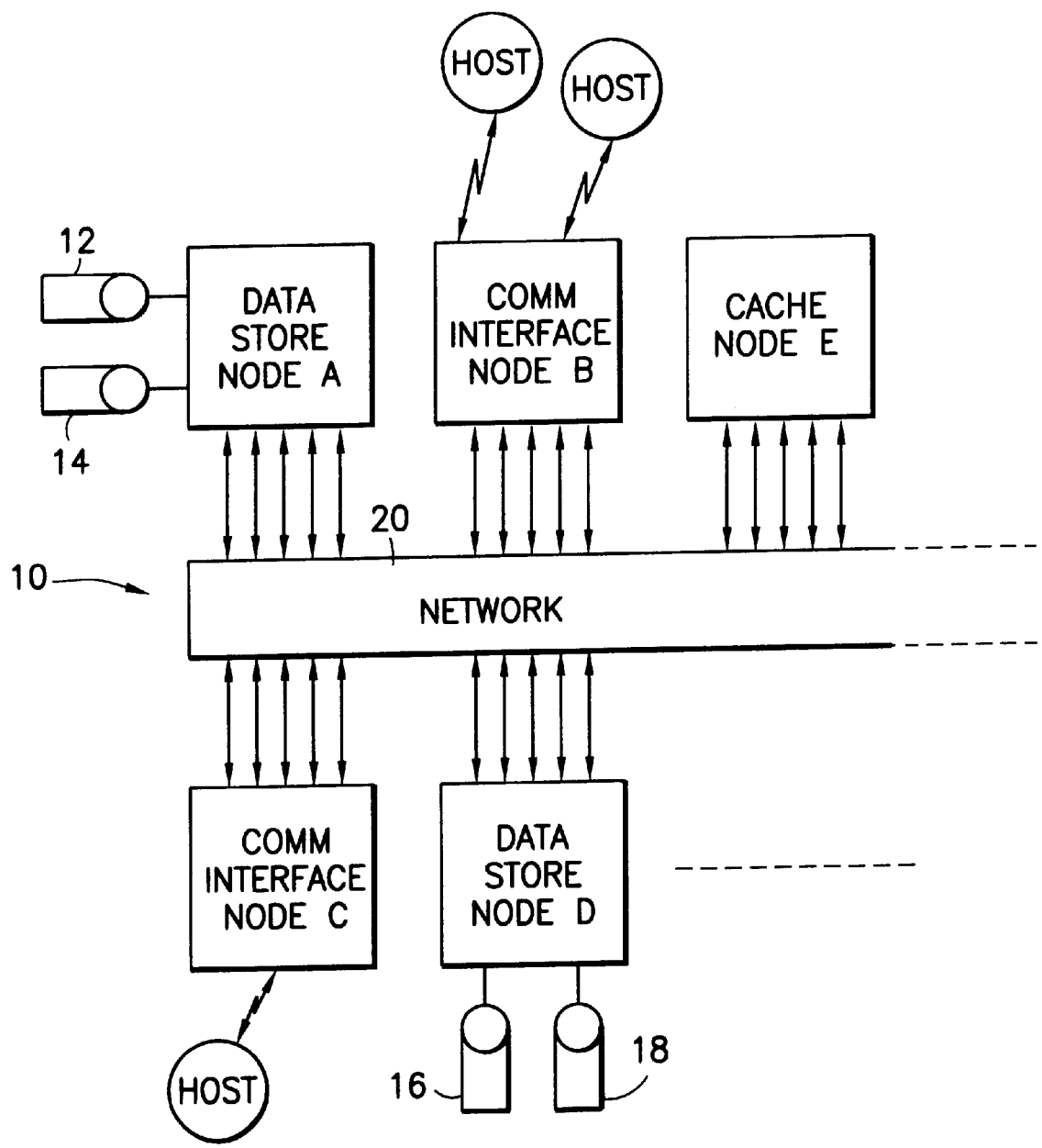
FIG. 1 is a block diagram illustrating a nodal data processing array.

The block diagram of FIG. 1 illustrates a multi-node network 10 configured as a disk drive controller array. Nodes A and D are data storage nodes that connect to coupled disk drives 12, 14 and 16, 18, respectively. A pair of communication interface nodes B and C provide input/output functions to coupled host processors which make use of the data storage facilities of the multi-node network. A cache node E provides temporary storage facilities for both input and output of data transfer functions between network 10 and one or more of the host processors. Multi-node network 10 is expandable by addition of further nodes, all of which are interconnected by an internal communication network 20.

Figure 2:
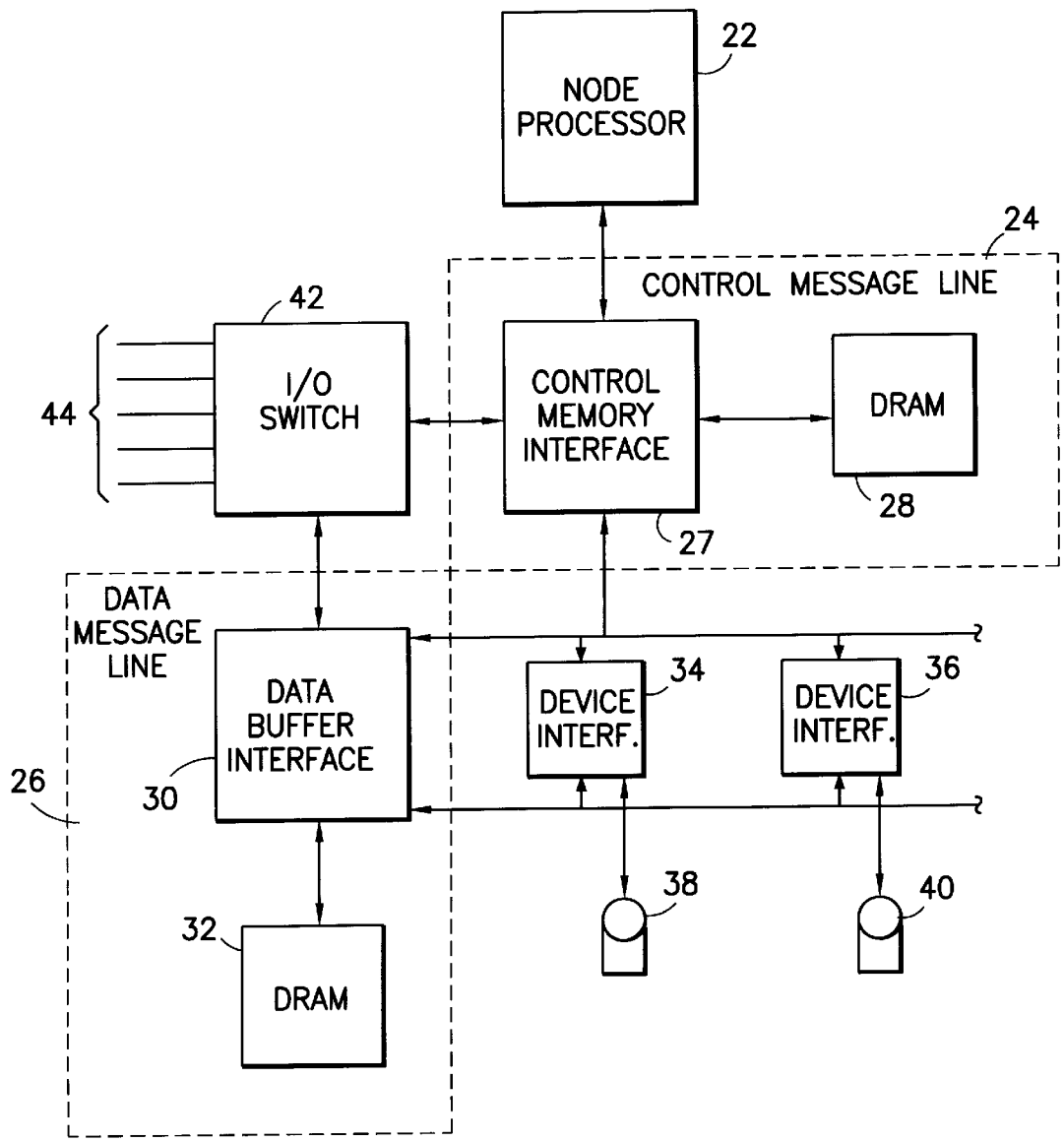
FIG. 2 is a block diagram of components of an exemplary node employed in the system of FIG. 1.

Each of nodes A–E is configured from a common node arrangement shown in FIG. 2. Each node includes a node processor 22 that controls the overall functions of the node. Each node further includes a control message "line" 24 for receiving, storing and dispatching control messages and a data message "line" 26 for receiving, storing and dispatching data messages. Control message line 24 comprises a control memory interface module 27 and a dynamic random access memory (DRAM) 28 which serves as a control message memory. Each data message line 26 includes a data buffer interface module 30 and a DRAM 32 for data messages. Data buffer interface module 30 connects to a plurality of device interfaces 34, 36, etc. which, in turn, provide communication to associated disk drives 38, 40, etc. Control messages originating from control memory interface 26, processor 22, etc. enable control of various node actions.

As will become apparent from the description below, the architecture of multi-node network 10 is configured to efficiently handle both long data messages that characteristically occur from/to disk drives and a multiplicity of small control messages which are required to enable operation of both the network and individual nodes. Within each node, respective control and data message lines enable segregation of control and data messages and allow their independent processing and transfer to an input/output switch 42 which is provided in each node. I/O switch 42 includes apparatus which enables it to independently switch messages that arrive on one or more of input links 44 and are destined for another node. Each node is preferably provided with at least twice as many communication links 44 as there are lines, so as to provide each node with at least twice the communication bandwidth that is present within the node.

Each of communication links 44 is connected to another node, thereby enabling messages to either be directly routed to a connected node or to be routed through a connected node to another node, as the case may be. I/O switch 42 can direct messages from any communication link 44 to any other communication link 44. I/O switch 42 is further able to select, dynamically, the best communication link 46 to use, given a current state of the various links. Each of communication links 44 is independent and is usable for either data or control messages.

The node structure enables a distributed network to be configured wherein all message switching functions are distributed throughout the data processing system and eliminates a need for centralized switching control. It is only within a node that control and data messages are segregated and handled substantially independently. Each I/O switch 42 handles control and data messages in the same manner. Further, the multiple inter nodal links provide the system with a high level of robustness and redundancy in the event of a failure of one or a few nodes. Further details of I/O switch 42 are disclosed in U.S. patent application Ser. No. 08/448,901, the disclosure of which is incorporated herein by reference.

Figure 3A:
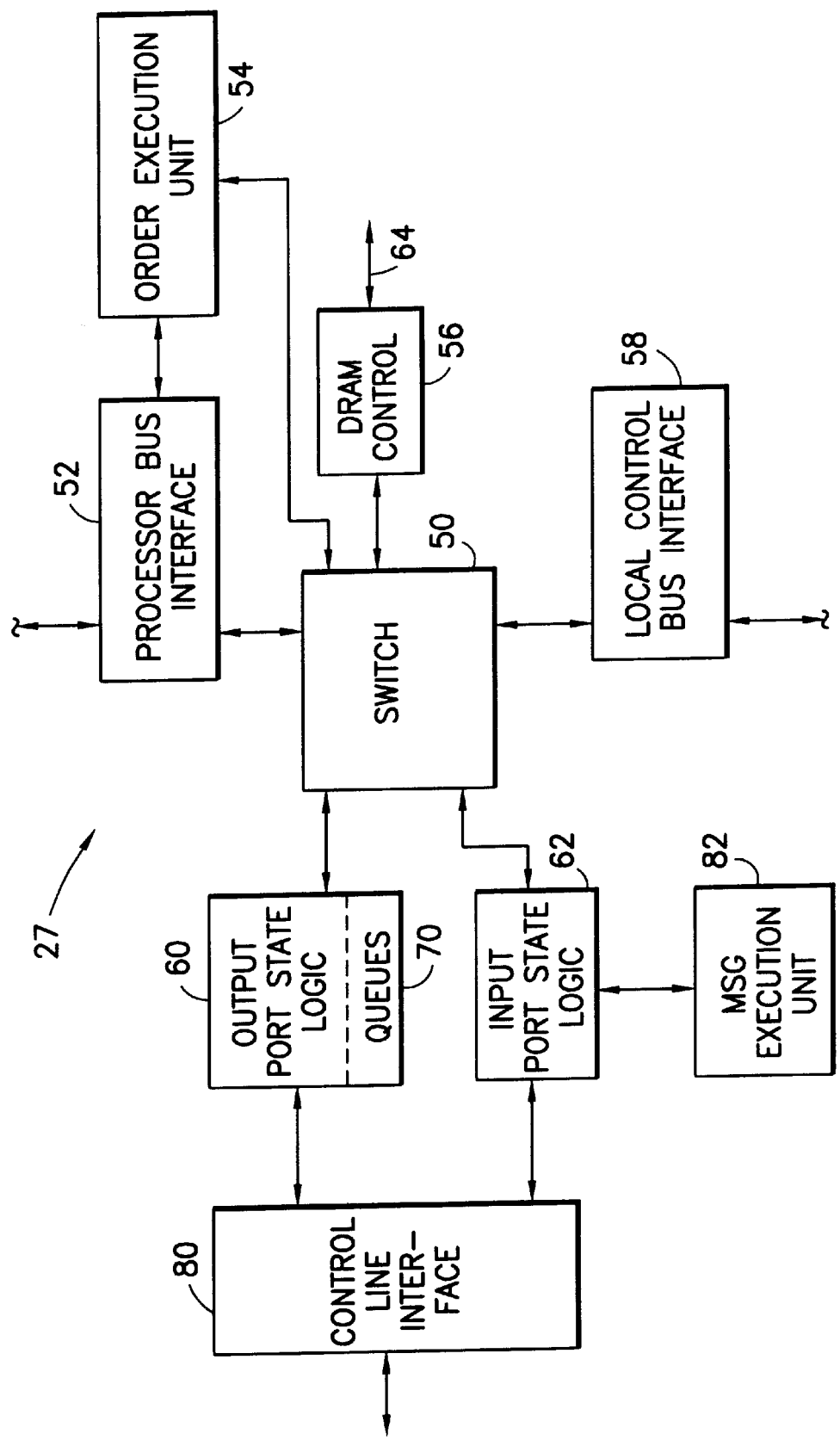
FIG. 3a is a block diagram of the control memory interface block contained in the node of FIG. 2.

FIG. 3a illustrates, further details of control memory interface module 27. A switch 50 enables communication between various of the functionalities within control memory interface module 27. These are a processor bus interface 52, an order execution unit 54, a DRAM controller 56, a local control bus interface 58, output port state logic 60 and input port state logic 62. DRAM controller 56 enables attachment of a random access memory 28 via an operand memory bus 64.

Processor bus interface 52 is an interface to node processor 22 and provides a path that enables memory fetches and stores. Order execution unit 54 interprets, fetches and stores data to certain memory-registers as orders to be executed. Some but not all orders are executed in this unit and enable expedited handling of certain orders, without specific involvement of node processor 22.

Local control bus interface 58 enables access between node processor 22 and data buffer interface 30 (FIG. 1) and the various device interfaces 34, 36 . . . that are connected to data buffer interface 30. Node processor 22, via local control bus 58 is able to perform a number of functions, i.e., fetch and store to data memory 32; issuance of orders to one or more device interfaces 34, 36; transfer of data from control message line 24 to data message line 26 and vice-versa, etc.

Figure 3B:
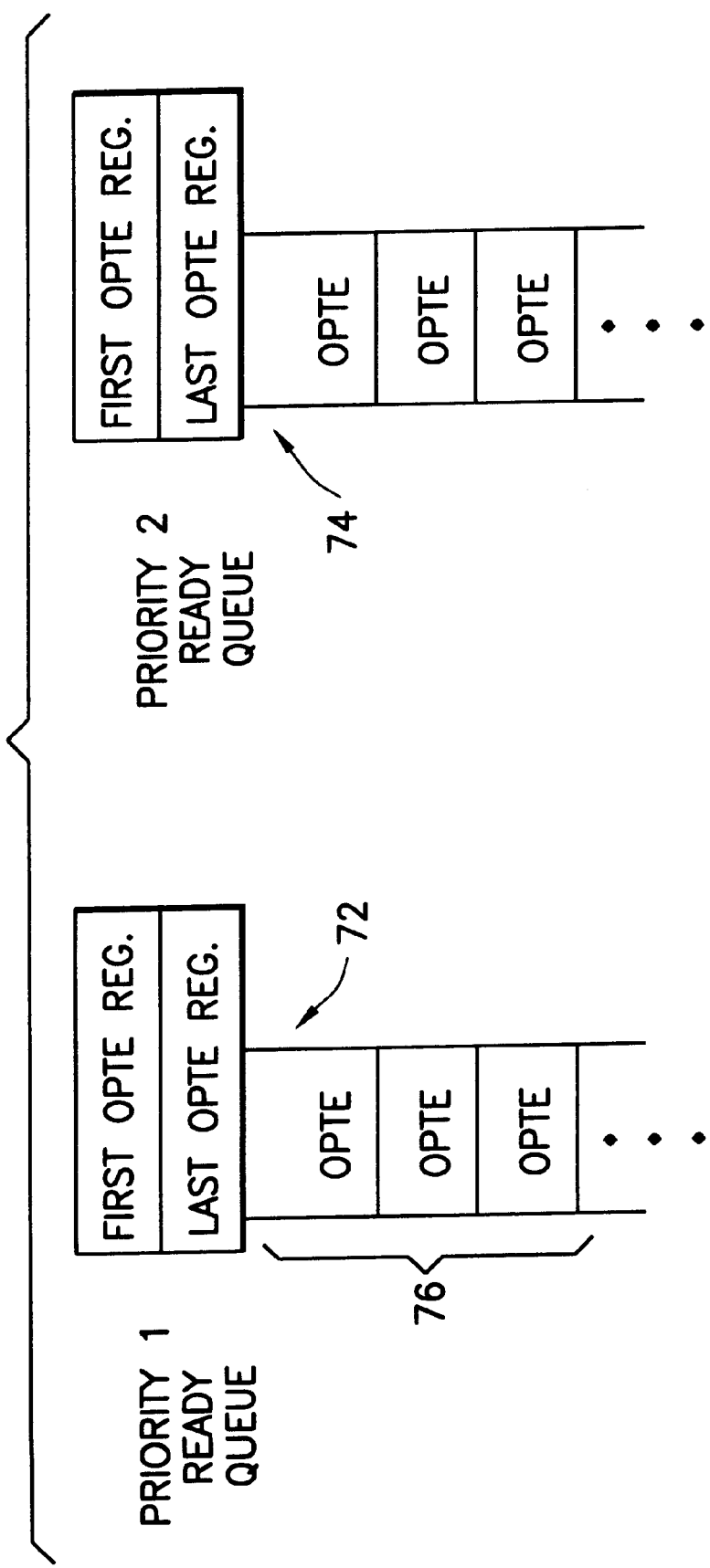

Output port state logic 60 includes a plurality of Ready queues 70 wherein messages of various levels of priority are queued, awaiting transmission. In FIG. 3b, a priority #1 Ready queue 72 and a priority #2 Ready queue 74 are illustrated. Each Ready queue is a first-in, first-out (FIFO) queue and comprises a plurality of registers 76 wherein tasks to be dispatched that are assigned common priority are listed and a pair of registers 78 and 80 wherein identifiers of the queue's first listed task and last listed task are stored. Each task is denoted by an output port table entry (OPTE) which is a logical data structure stored in a table (i.e. the Output Port Table (OPT)). Each logical data structure is hereafter called a "control block". Each OPTE has further control blocks chained from it which further define specific aspects of the particular task.

Each control block employed to implement the invention will be described in detail below. Further, procedures will be described for enqueuing OPTE's on Ready queues 70 that are ready for execution and for dynamically chaining subtasks to OPTE's while they are in the process of dispatch. As will become hereafter apparent, output port state logic 60 attempts to transmit each message in a highest priority Ready queue before proceeding to a next lower priority Ready queue.

Input port state logic 62 receives control messages from control message line interface 80 and briefly buffers them. It decodes the control messages according to class (i.e., hardware executed or processor executed), and hardware executed messages are forwarded to message execution unit 82 where they are executed. Processor executed messages are received into memory addresses within DRAM 28 in a logical input data structure that corresponds to a function required by code in a received control message header. At some later time, the function is executed.

Figure 4:
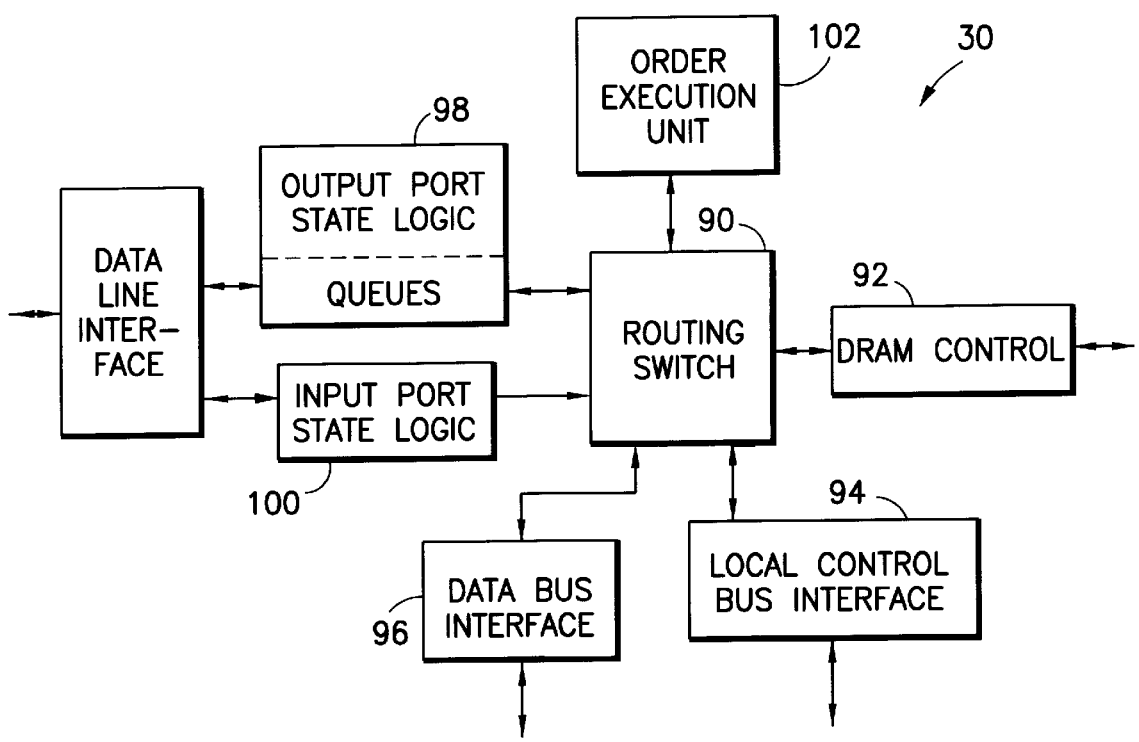
FIG. 4 is a further detailed block diagram of the data buffer interface block of the node of FIG. 2.

Referring to FIG. 4, details of data buffer interface module 30 will be described. Structurally, it is similar to control memory interface module 27. Data buffer interface module 30 is constructed around a switch 90 which enables communication between the various connected functionalities. A DRAM controller 92 enables access to data memory 32. Local control bus interface 94 interconnects to control memory interface module 27 to enable receipt and transfer of control messages. Data bus interface 96 enables access to and from device interface modules 34, 36 and their respectively connected disk drives. Output port state logic module 98 and input port state logic module 100 are constructed in much the same fashion as the output/input port state logic modules of control memory interface 27, however, the data structures processed therein are more complex. Order execution unit 102 executes hardware executed messages related to data message line functions. Data Line interface 104 enables communication with I/O switch 42.

The above described control and data message line structures enable control messages and data messages to be handled substantially independently. This enables long data messages to be queued and transmitted while control messages are processed and readied for transmission in a concurrent fashion. As a result, there is no need to preempt the processing of long data messages for control messages.

Operations within the node of FIG. 2 are controlled by software-generated control blocks. For any read or write action, plural control blocks are assigned by software working in conjunction with node processor 22 to enable setup of the hardware within the node in accordance with a required action. For any single read or write, the software assigns plural control blocks. Each control block includes at least one parameter required to enable a setup action by the hardware for the read or write action.

Control block data structures enable a node to assemble a message that is to be transmitted to either another node, to a disk drive or to a host processor. The message may be assembled through use of plural control blocks that are "chained" so that one control block includes a pointer to a next control block. Control blocks further indicate a data processing action to occur that will enable assembly of data for a message; where the data is to be found; a designation of its structure; identification of buffer storage area for holding the data comprising the message (pending dispatch); and further data which identifies where the data is to be dispatched. The invention makes use of input control blocks (ICBs) and output control blocks (OCBs). Each ICB and OCB respectively comprise a message. OCBs (and ICBS) may be "chained" and as such, define a series of messages that have a sequence dependency that tracks the sequence of the chained blocks.

Software Control Block Data Structures

A description will now be provided of the control blocks that are employed to control the operation of the node of FIG. 2. In FIGS. 5a–5d, combined hardware/software block diagrams illustrate the control blocks which enable both data messages and control messages to be dispatched and received.

Figure 5A:
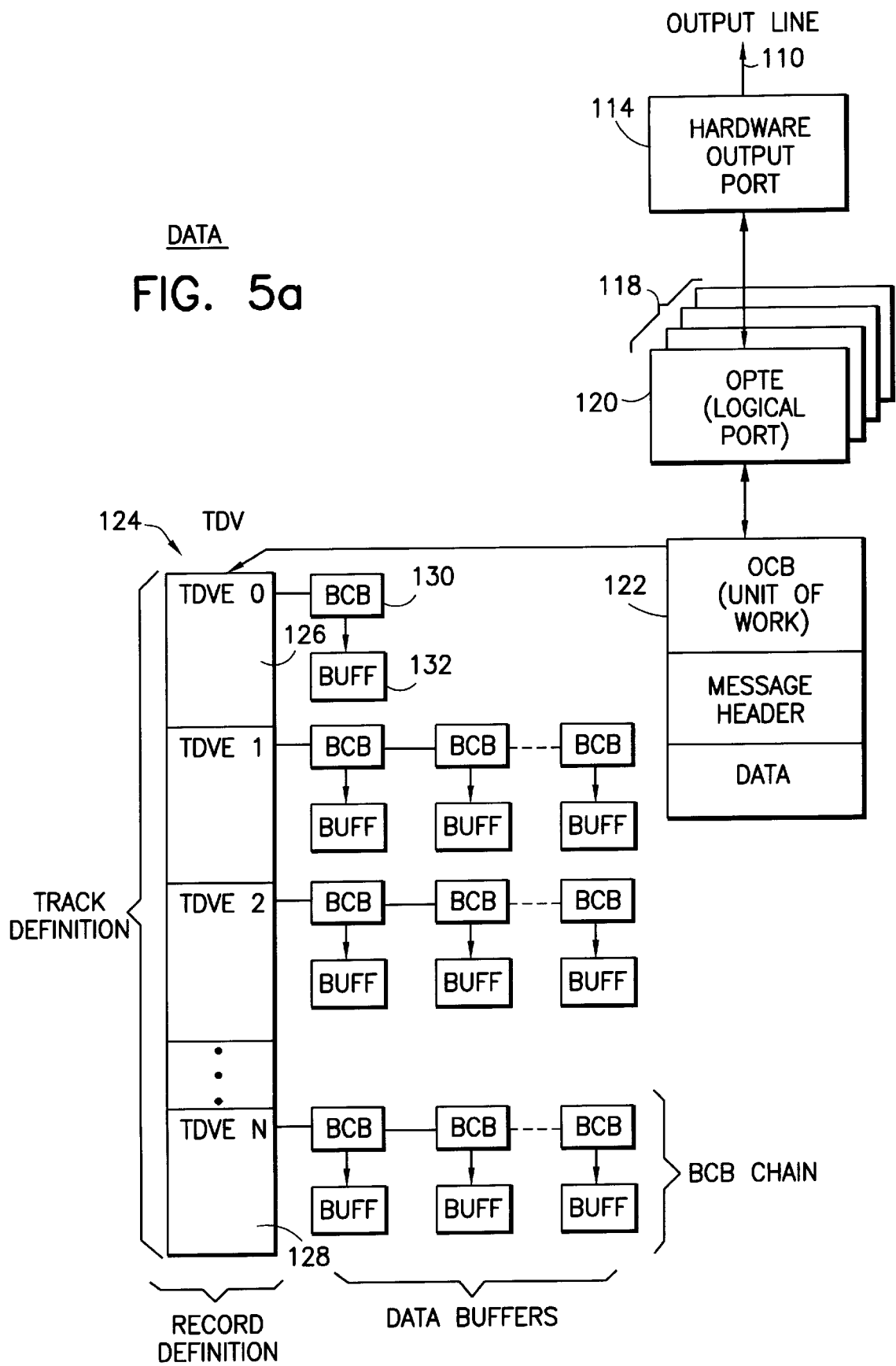
FIG. 5a is a diagram showing hardware and software control blocks that enable data messages to be compiled and dispatched.
Figure 5B:
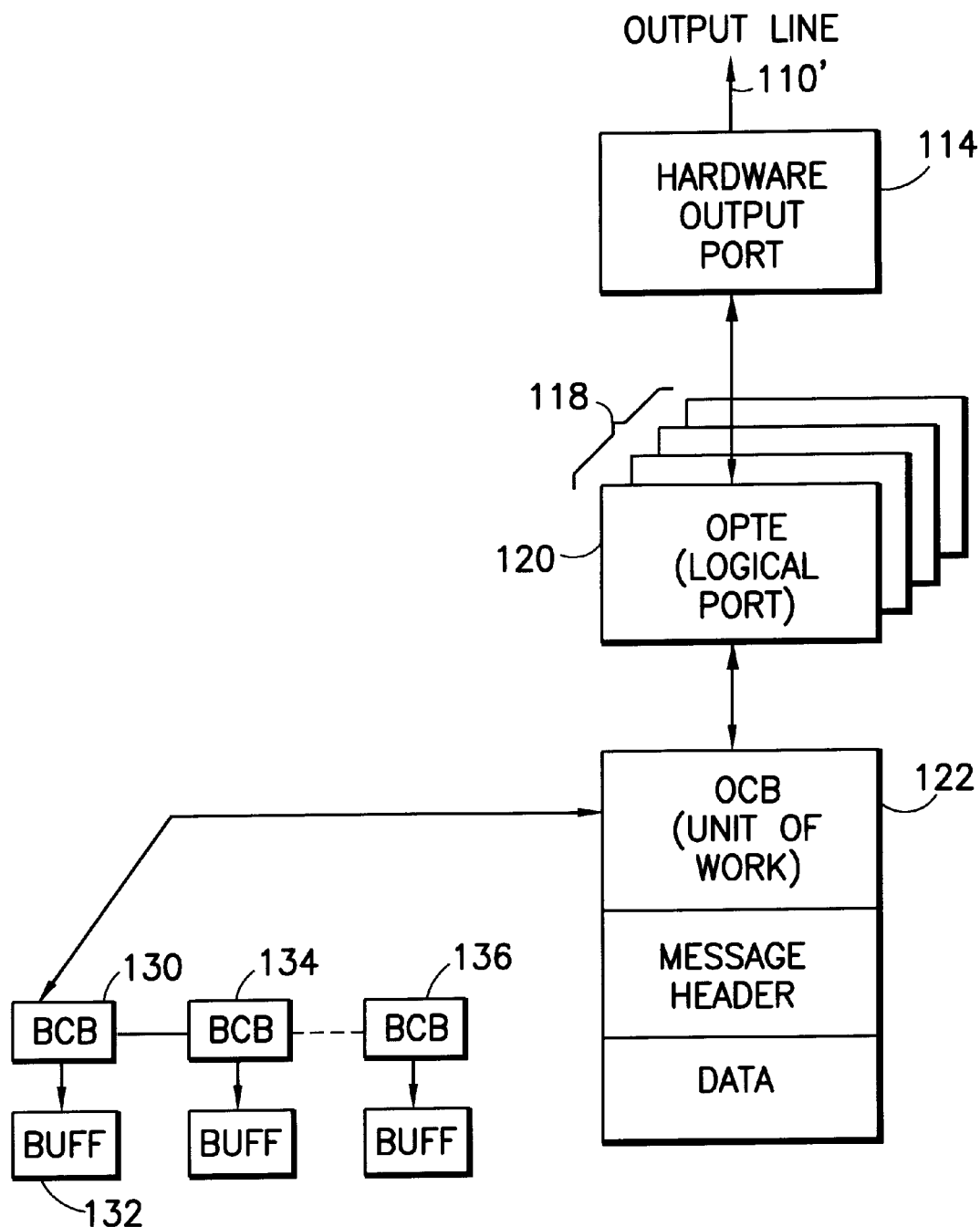
FIG. 5b is a diagram showing hardware and software control blocks that enable control messages to be compiled and dispatched.
Figure 5C:
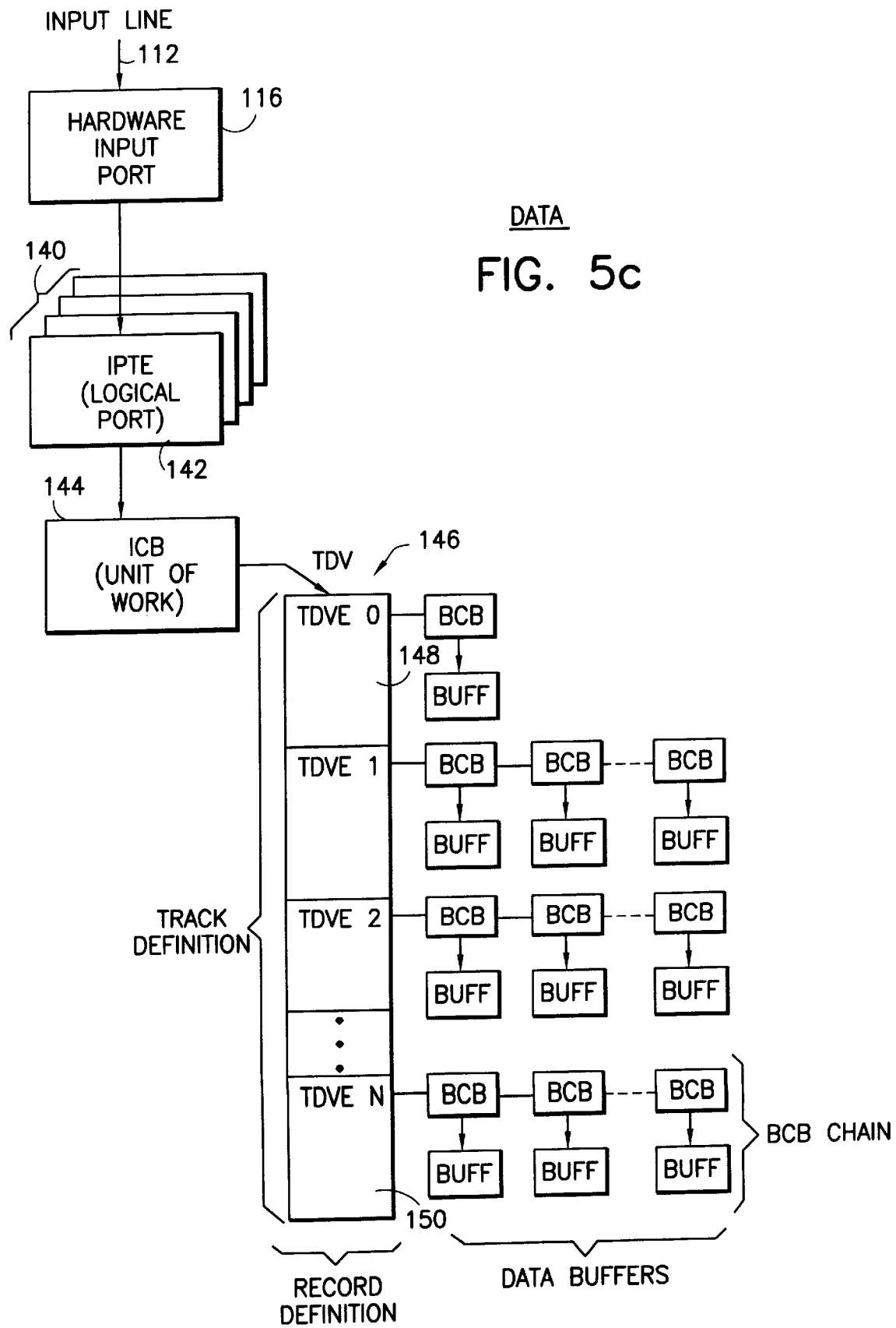
FIG. 5c is a diagram showing hardware and software control blocks that enable data messages to be received and stored.
Figure 5D:
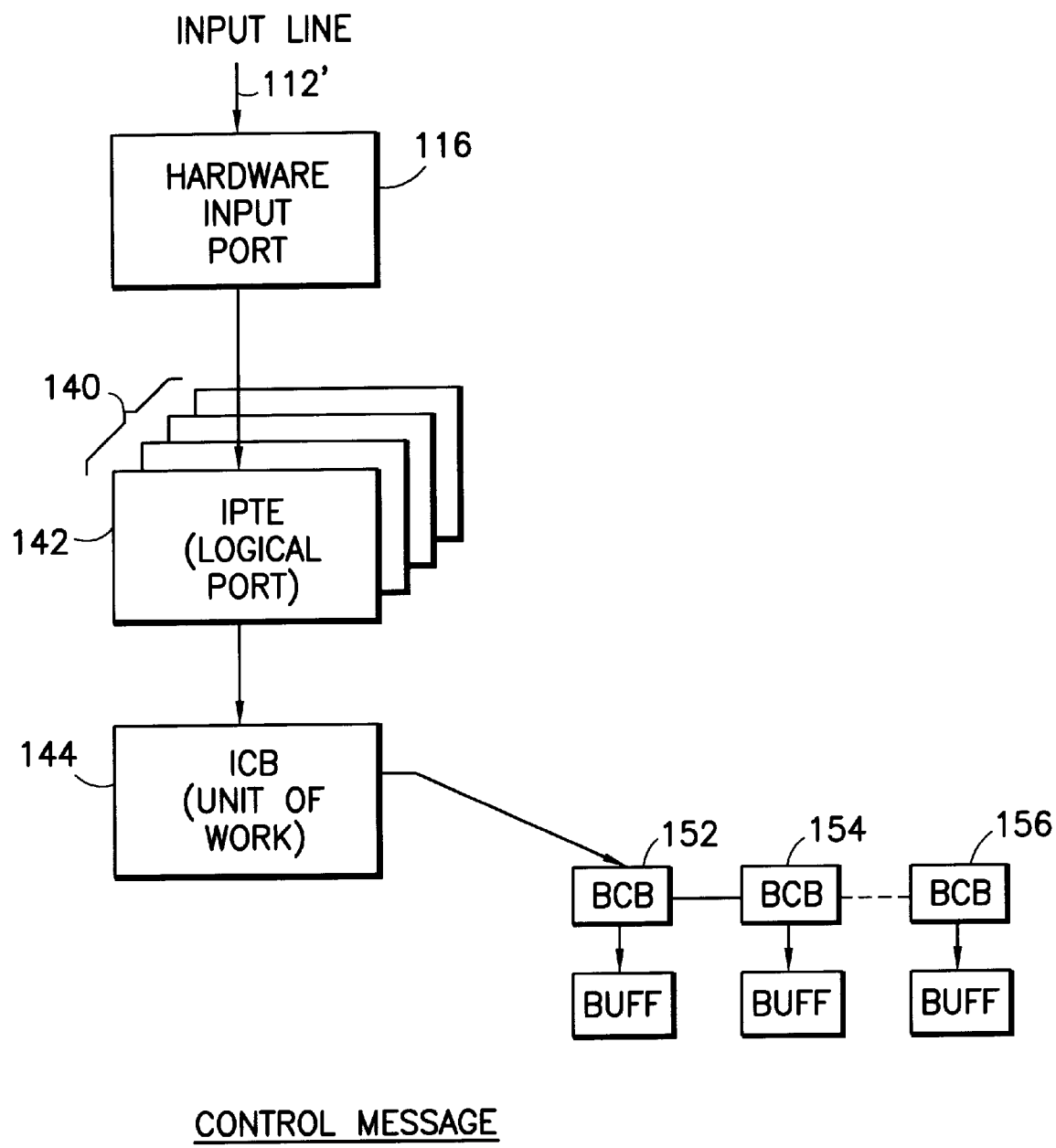
FIG. 5d is a diagram showing hardware and software control blocks that enable control messages to be received and stored.

Referring to FIGS. 5a and 5c, each node includes a data output "line" and a data input "line" of control blocks that, respectively, handle outgoing and incoming data messages. FIGS. 5b and 5d illustrate control output and input lines, respectively, for handling of control messages.

Output Line Control Blocks (Control and Data Messages)

The data output line in FIG. 5a includes an output circuit 110 that is fed by a hardware output port 114. An equivalent hardware input port 116 (see FIG. 5c) receives data messages via an input circuit 112. Hardware output port 114 is a physical entity in buffer interface 34 (see FIG. 2) that manages processing and storage of out-bound data messages. Hardware output port 114 includes a set of associated hardware registers (not shown in FIGS. 5a, 5c) which configure multiple priority Ready queues and receive control data from control block data structures, to be hereafter described. When the requisite control data is inserted into the Ready queues, a particular data processing action can then be accomplished (e.g., a message assembly and transmission)—using the control data present in the registers.

Hardware output port 114 is associated with an output port table (OPT) 118 that lists the "logical ports" assigned to hardware output port 114. Each logical port is defined by an output port table entry (OPTE) 120, a portion of whose data structure is shown in Table 1 below.

TABLE 1

| OUTPUT PORT TABLE ENTRY (OPTE) |
| --- |
| FIRST OCB OF CHAIN |
| LAST OCB OF CHAIN |
| FLAGS (STATUS SAVED, READY) |
| NEXT OPTE |
| INPUT PHYSICAL PORT |
| INPUT LOGICAL PORT |

An OPTE 120 includes a designation of a first output control block (OCB) required to commence a data processing action, and a designation of the last output control block (OCB) that terminates the data processing action. Intermediate OCBs are determined by chaining values contained within the individual OCB control blocks. OCBs enable location of data to be subjected to the data processing action.

An OPTE 120 further includes: flags which define interrupt conditions, status states, response states, etc. One such flag is a Ready flag which, when set, indicates that the OPTE has been placed on a Ready queue for dispatch. A Status Saved flag, when set, indicates that dispatch of the OPTE was interrupted and that its status was saved so that a dispatch action could later pick up where the last dispatch action terminated. OPTE 120 also includes pointers to both a hardware input data port 116 (FIG. 5c) and a logical input port. Those skilled in the art will realize that software generated control messages enable the node to set up the various entries in OPTE 120 and all OCBs that are chained therefrom.

When software causes node processor 22 to establish an output line for a task, e.g., to compile and transmit a message to another node, the task is entered into Output Port Table 118 (FIG. 5a) by inserting the task's OPTE control block into the table. The OPTE, as above indicated, includes a Ready flag which is set equal to 0 until the entire task has been compiled and the OPTE has been listed on a Ready queue, at which time the Ready flag is set to 1. Until that time, the task is not ready for dispatch. Thus, OPT 118 potentially includes many tasks that are in various stages of assembly, with some being ready for dispatch, some being possibly interrupted and still others in the process of compilation.

Chained from each OPTE 120 are one or more output control blocks (OCBs) 122 which, in combination with further chained control blocks, define where the data is to be found that is to be dispatched. An OCB 122 (see FIG. 5*a*) includes further information and its data structure is illustrated in Table 2 below:

TABLE 2

| OUTPUT CONTROL BLOCK (OCB) |
| --- |
| NEXT OCB POINTER |
| START TDVE |
| END TDVE |
| FLAGS |
| DESTINATION ADDRESS |
| LOGICAL INPUT PORT ADDRESS AT DEST. |
| MESSAGE DATA |
| TDV/BCB |

An OCB 122 data structure includes a pointer to a next OCB which implements a chaining of units of work or tasks that make up an OPTE. An OCB 122 also includes pointers to a track descriptor vector (TDV) table 124. Those pointers point to a start track descriptor vector entry (TDVE) 126 and an end TDVE 128, both in TDV 124. As will be understood from the description below, the listed TDVEs are control blocks which enable identification of disk drive memory areas where one or more data records are to be found and, further, wherein additional data is to be found in denoted buffer areas. Further details of TDVE control blocks will be described below.

An OCB 122 further includes a destination address for the data and a logical input port number at the destination where the data is to be directed. An OCB 122 may also include control message data to enable control information to be transmitted to a destination address without requiring further chained data. Lastly, an OCB includes an address of a buffer control block (BCB) 130 of data if data comprising a portion of the task is stored in buffer memory.

An OCB, as indicated above, includes information that enables location of data within a disk drive track. That information specifies a track descriptor vector (TDV) table 124 which includes a plurality of track descriptor vector entries 126–128. Thus, TDV table 124 defines a logical disk track that may comprise plural physical disk tracks. TDVEs 126, 128 are control blocks which describe a physical disk record's format on the disk drive. In addition to a start TDVE pointer 126, an OCB 122 also includes an end TDVE pointer 128 so that all records for the OCB action are identified by data within or accessible from OCB 122.

The TDVE data structure is illustrated in Table 3 below:

TABLE 3

| TRACK DESCRIPTOR VECTOR ELEMENT (TDVE) |
| --- |
| FIELD 1 DATA ID (e.g. COUNT) |
| FIELD 2 LENGTH (e.g. KEY) |
| FIELD 3 LENGTH (e.g. DATA) |

TABLE 3-continued

| TRACK DESCRIPTOR VECTOR ELEMENT (TDVE) |
| --- |
| FLAGS |
| FIRST BCB |
| RECORD NUMBER |

Assuming that records on a disk track are arranged using the known "Count, Key, Data" structure, a TDVE will including field descriptors for each of the Count, Key and Data fields. The Count key field will include the record count number that occurs in field 1 of the record; the field 2 value will include the length of the record name (i.e., the Key); and the field 3 value will indicate the length of the data in the Data portion of the disk record.

As with other control blocks (remembering that each TDVE 126, 128, etc. is a control block), flags are included which define interrupt states, control states, etc. A TDVE further includes a pointer to a first buffer control block (BCB) 130. A BCB 130 includes data which enables identification of physical buffer space which holds data that is portion of the message to be dispatched as part of the overall task. As shown in FIG. 5*a,* BCBs can be chained. Thus, each TDVE may include a pointer to a first BCB 130. A BCB data structure is shown in Table 4 below:

TABLE 4

| BUFFER CONTROL BLOCK |
| --- |
| NEXT BCB POINTER |
| DATA BYTES IN BUFFER |
| BUFFER SIZE |
| FLAGS |
| BUFFER ADDRESS |

A BCB 130 data structure commences with a pointer to a next BCB (if any), it being realized that plural buffer locations may be allocated for task-related data. A next entry in a BCB control block defines the number of data bytes stored in the physical buffer space and the actual buffer size. Further, flags indicate various control states that are included in a BCB as well as the physical address of a buffer (e.g. buffer 132) in which the data resides.

In the case of control messages (see FIG. 5*b*) due to the relative simplicity thereof, the use of a TDV table and its included TDVEs is unnecessary. As a result, an OCB 122 includes a pointer to a BCB 130 that defines a first portion of control message that is stored in buffer area 132. Additional BCBs 134, 136 may chained from BCB 130.

Input Line Control Blocks (Data and Control Messages)

Control block data structures employed in a node also include an input port table (IPT) input port table entries (IPTE) and input control block (ICBs). Those control blocks are employed to handle input tasks received from other nodes. In FIG. 5*c,* an IPT 140 includes a plurality of IPTEs 142 which define various input tasks. Each IPTE includes a pointer to an ICB 144 which defines a unit of work to be accomplished. Each ICB 144 includes a pointer to a track descriptive vector (TDV) table 146 which, in the manner above described, defines areas of a disk memory to be utilized in the performance of the unit of work defined by ICB 144. ICB 144 will further have an indication of an initial track descriptor vector element (TDVE) 148 and a last TDVE 150. As above described, TDVEs may have one or more BCBs chained therefrom.

Each IPTE includes a data structure such as shown in Table 5 below:

TABLE 5

INPUT PORT TABLE ENTRY (IPTE)

FIRST ICB
LAST ICB
FLAGS
POINTER TO OUTPUT HARDWARE PORT
POINTER TO OUTPUT LOGICAL PORT

An IPTE includes a designation of a first input control block (ICB) required to commence a data processing action and a designation of a last ICB that completes the action. Intermediate ICBs are determined by chaining pointers contained within the ICB control blocks.

When an input data message is received by hardware input port 116, a series of ICBs 144 are assigned to enable execution of the required task. The data structure of relevant portions of an ICB are shown in Table 6 below:

TABLE 6

INPUT CONTROL BLOCK (ICB)

NEXT ICB POINTER
FLAGS
SECTOR LENGTH
SECTOR COUNT
START TDVE
END TDVE
TDV/BCB POINTER

Each ICB 144 includes a next ICB pointer which is an address value of a next ICB control block (to enable a chaining action between succeeding ICBs). The pointer to the first ICB 144 is contained in an IPTE 142 and through the use of that pointer, all ICBs associated with IPTE 142 are determinable (in combination with ICB to ICB pointers). TDVE pointer data enables identification of disk drive tracks wherein input data is to be either stored or from which data is to be derived from the data processing action required by the incoming task.

In FIG. 5d, the logical control blocks employed for a control message are illustrated. As with control message associated with OPTEs and OCBs, because of the simplicity of the control message, the TDVE control blocks are not required and each ICB is enabled to directly point to an associated one or more BCBs 152, 154 and 156.

Orders

As above described, node processor 22 (FIG. 2) is software controlled and, in turn, controls the overall operation of the node. Within the node are certain hardware functions which operate substantially independently and relieve node processor 22 of subsidiary control functions. As shown in FIG. 3a, output port state logic 60 and input port state logic 62 are both state machines which control output and input functions, respectively.

Output port state logic 60 controls the plurality of priority-ordered queues 70 and enables tasks to be outputted, in priority order, as required for operations of the overall data processing system. The operation of output port state logic 60 may involve a number of machine cycles to complete and may result in contention for resources with other active processes that are on-going within the node. To avoid such contention, node processor 22 is enabled to issue Orders which initiate an atomic manipulation of facilities in a hardware structure and, in essence, lock-out any access to that hardware facility while the "Ordered" procedure is on-going.

When software issues an Order "Ready Output Port", until an OPTE has been enqueued and an attempt been made at its dispatch (or dispatch of another OPTE), software is prevented from accessing output port state logic 60. Similarly, software can issue and "Add ICB/OCB to Chain" Order. Such an Order, for instance, causes an OCB which is ready for dispatch to be chained to an un-dispatched OCB. Here again, software is prevented from changing any data associated with the OCB to be chained.

Addition of a Task to a Ready Queue

Figure 7:
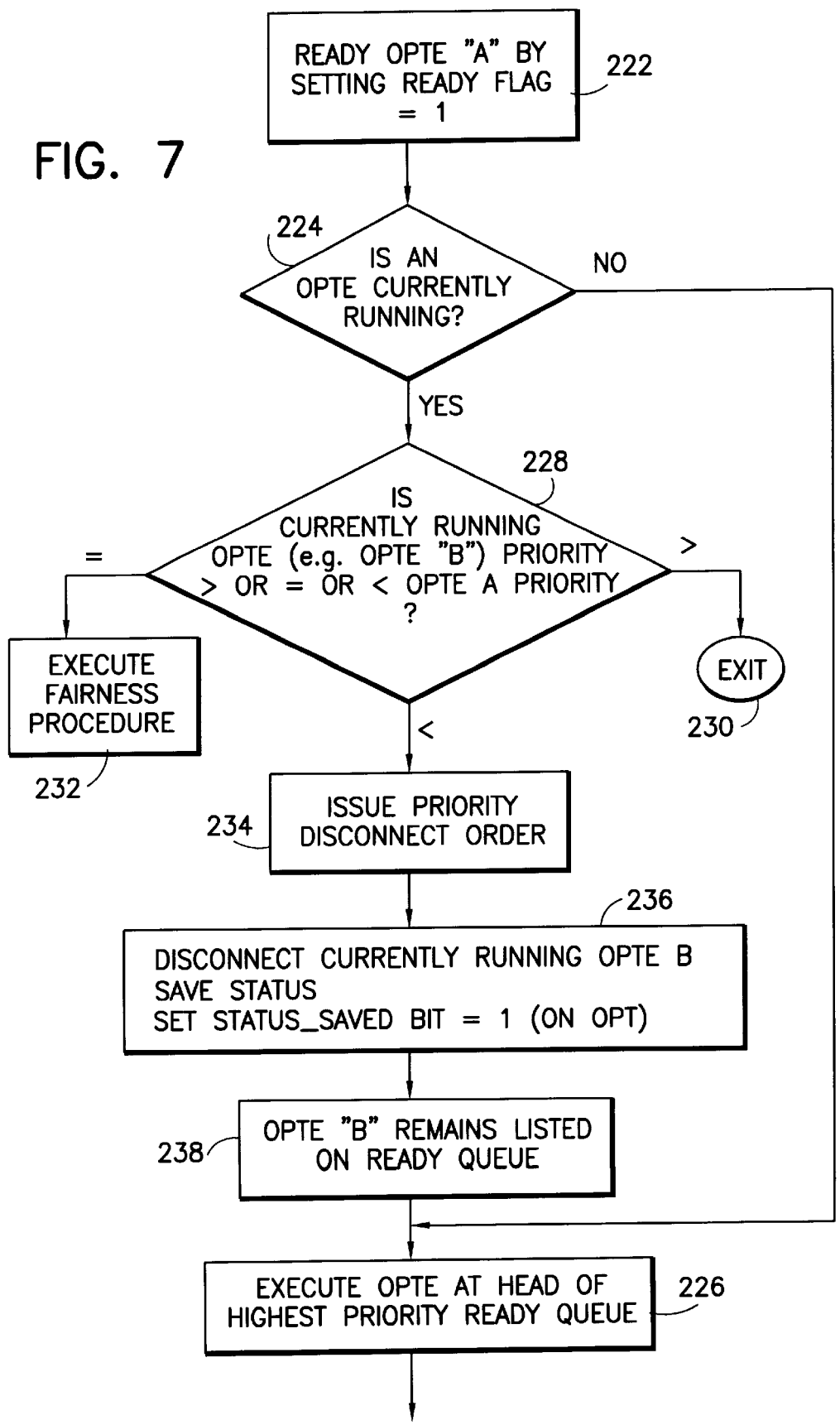
Figure 8:
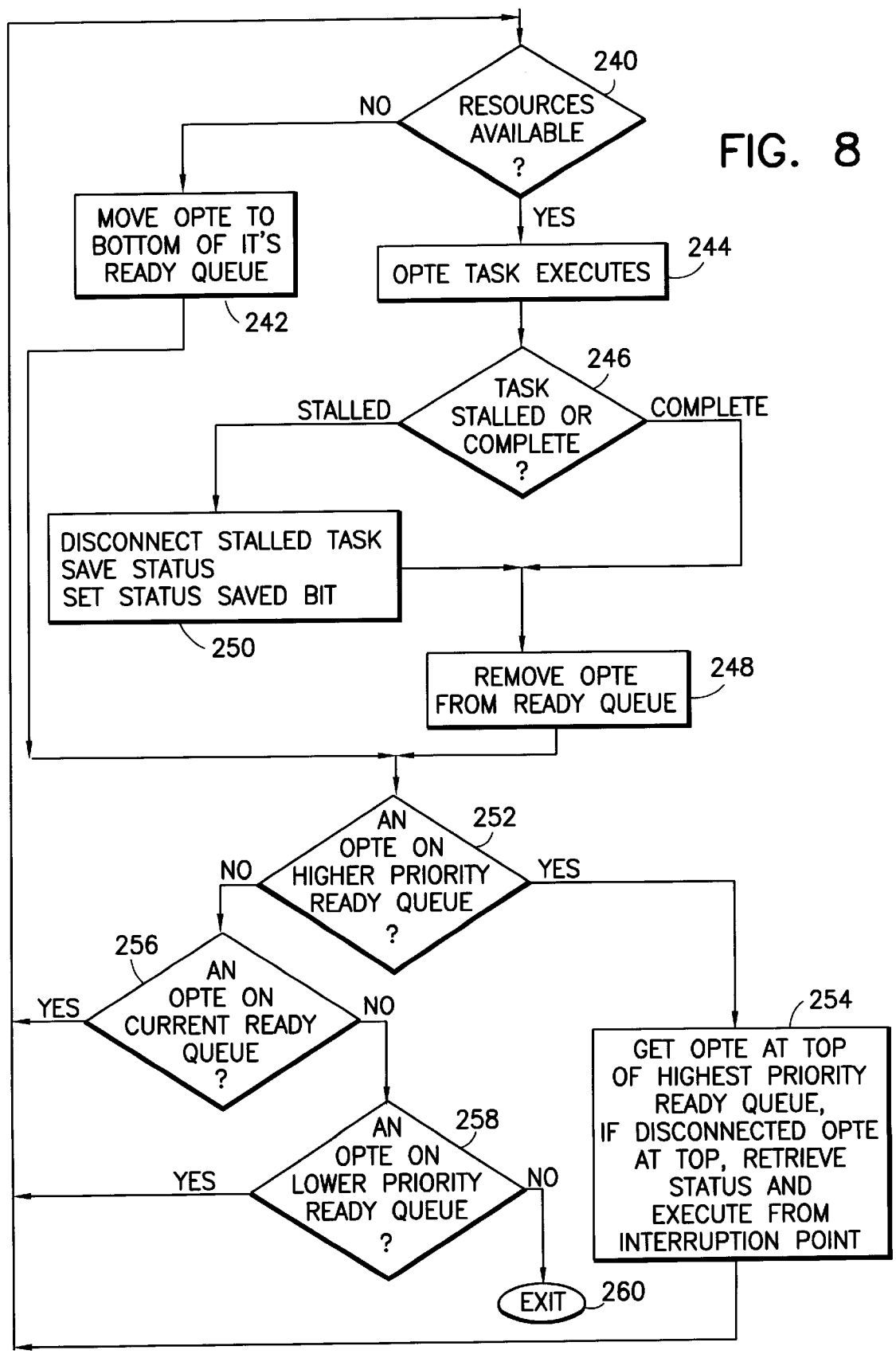

Referring now to FIGS. 6–8 and the logical flow diagrams shown therein, a procedure for adding a task to an output port Ready queue will be described. Initially (box 200) software causes node processor 22 to issue a Ready Output Port Order for a given task, e.g., OPTE A. In response to receipt of that Order, output port state logic 60 (FIG. 3a) determines if any OPTEs are listed on its Ready queues (decision box 202). If no, then the OPTE A task is immediately executed (box 204). If an OPTE is listed on a Ready queue, then it is known that OPTE A may not be able to be immediately executed.

Initially, output port state logic 60 determines if the Ready flag in the OPTE A control block is set to 1. If yes, it means that OPTE A has already been placed on a Ready queue and the procedure exits (bubble 208). If the OPTE A Ready flag is not set to 1, output port state logic 60 checks the first/last registers of a Ready queue which exhibits an assigned priority that is equal to the priority of OPTE A (box 210). The check process initially determines if the first register value is equal to 0 (decision box 212). If yes, it means that no other OPTEs are queued in that Ready queue and that OPTE A will be the first task to be listed thereon. In such case, the address of OPTE A is written into both the first and last registers (box 214) of that Ready queue. Additionally, a "0" is written into the Next OPTE field of the OPTE A control block—indicating that no other OPTEs are chained from the OPTE A control block (box 216).

If, as shown in decision box 212, the value in the Ready queue's First register is other than 0, at least one other OPTE is positioned on the Ready queue. In such case, the OPTE A address is written into the queue's Last register (box 218) and the address of the OPTE A control block is written into the next OPTE field of the last OPTE listed on the Ready queue (box 220). Since OPTE A is now listed on the Ready queue, that fact is indicated by setting the Ready flag in OPTE A equal to 1 (box 222, FIG. 7).

At this stage, output port state logic 60 proceeds to determine if an OPTE is currently running (i.e. being executed) (decision box 22). If no, output port state logic 60 attempts execution of the OPTE which is at the head of the highest priority Ready queue (box 226). Note, that such OPTE may not be OPTE A but may be some other OPTE which has reached the top of any Ready queue that exhibits a higher priority than the Ready queue on which OPTE A is listed. This assures that preference is always given to higher priority tasks, at the expense of lower priority tasks. In the system shown in FIG. 1, such high priority tasks generally comprise control functions which exhibit short message lengths, but are vital to the proper functioning of the network. Thus, such control functions are dispatched with high priority and are not delayed because of an enqueuing of a lower priority OPTE.

If a currently running OPTE has a lower priority than the newly enqueued OPTE, then execution of the currently running OPTE is interrupted. Thus, if decision block 224 indicates that an OPTE is currently running, output port state logic 60 determines if the currently running OPTE has a priority that it is greater than, equal to, or less than the priority of OPTE A. Assuming that the currently running (i.e., executing) OPTE is OPTE B which exhibits a higher priority than OPTE A (decision box 228), the procedure exits (bubble 230). If it is found that OPTE A and OPTE B both have the same priority level, a "fairness" procedure (box 232) is executed which assures that no one task of a specific priority is enabled to long defer execution of another task of the same priority.

In brief, the fairness procedure enables output port state logic 60 to multiplex tasks of common priority. Thus, when an amount of data transmitted for a first task reaches a threshold, that task is disconnected and another task on the same queue commences execution, with both tasks being multiplexed until both complete. Details regarding the fairness procedure can be found in U.S. patent application Ser. No. 08/176,042 of Brady et al., assigned to the same assignee as this patent application. The disclosure of U.S. patent application Ser. No. 08/176,042 is incorporated herein by reference.

If, as shown in decision box 228, it is found that the currently executing OPTE B has a priority that is less than a priority assigned to OPTE A, a Priority Disconnect Order is issued (box 234) which causes currently running OPTE B to be disconnected (box 236). At such disconnect time, the status of execution of OPTE B is saved by recording the last control block that is chained from OPTE B whose execution was completed. Thereafter, when OPTE B is again reached for execution, the execution status is recovered and execution continues, starting with the control block that immediately follows the control block whose execution was complete. This procedure assures that all BCBs that are chained from an OPTE will be executed in order of chaining. While the BCBs may not be executed in a continuous run, the receiving node is assured that all BCBs will be received in chained order. This is not the case with OPTEs which may be executed in any particular order, depending upon priority, availability of assets, etc.

Once the execution status of a disconnected OPTE B has been saved, a status saved flag in the OPTE B control block is set to one. Since OPTE B is still listed in the OPT, when OPTE B is again reached, the status saved flag will signal to the system that its status must be retrieved and execution commenced from the point of disconnect.

Even though OPTE B is disconnected, it remains listed on its ready queue (box 238) as it is not complete. Output port state logic 60 is now ready to execute an OPTE, but not necessarily OPTE A which has just been enqueued and has been found to be a higher priority than OPTE B which was being executed. As above indicated, output port state logic 60 proceeds to execute the OPTE at the head of the highest priority ready queue (box 226). To accomplish such execution (see FIG. 8), it is first determined whether resources are available to enable such execution (decision box 240). For instance, if a required data link is not available, then the resource required to execute the highest priority OPTE is unavailable and, in such case, that OPTE is moved to the bottom of its Ready queue (box 242). If by contrast, resources are available to enable execution of the highest priority OPTE, execution thereof commences (box 244). If the task completes, the completed OPTE is removed from its Ready queue (decision box 246 and box 248). If the task stalls due, for instance, to a malfunction, the stalled task is disconnected, its status saved and its status saved flag is set (box 250). The stalled task (i.e. OPTE) is then removed from its Ready queue and is available to be re-enqueued at some later time when the reason for the stall is removed.

At this stage, output port state logic 60 is available to handle a next OPTE. Thus, as is shown by decision box 252, if an OPTE is present on a Ready queue that exhibits a higher priority than the Ready queue holding OPTE A, the OPTE at the top of the highest priority ready queue is accessed (box 254). If the accessed OPTE is one which has been disconnected, its status is retrieved and execution commences from the interruption point (e.g., the next BCB (for example) that is chained to the last BCB which was complete). The procedure then recycles back to decision box 240 and repeats.

If no OPTE is present on a higher priority Ready queue, then the Ready queue holding OPTE A is accessed and the OPTE at its head is executed (decision box 256). If at a later time, no OPTE is found listed on the current priority Ready queue, the procedure moves to a lower priority Ready queue (decision box 258) and any OPTEs listed thereon are executed, as above stated. If no OPTEs are found on lower priority ready queues, the process exits (bubble 260).

Addition of a Task to an Executing Task.

Figure 9:
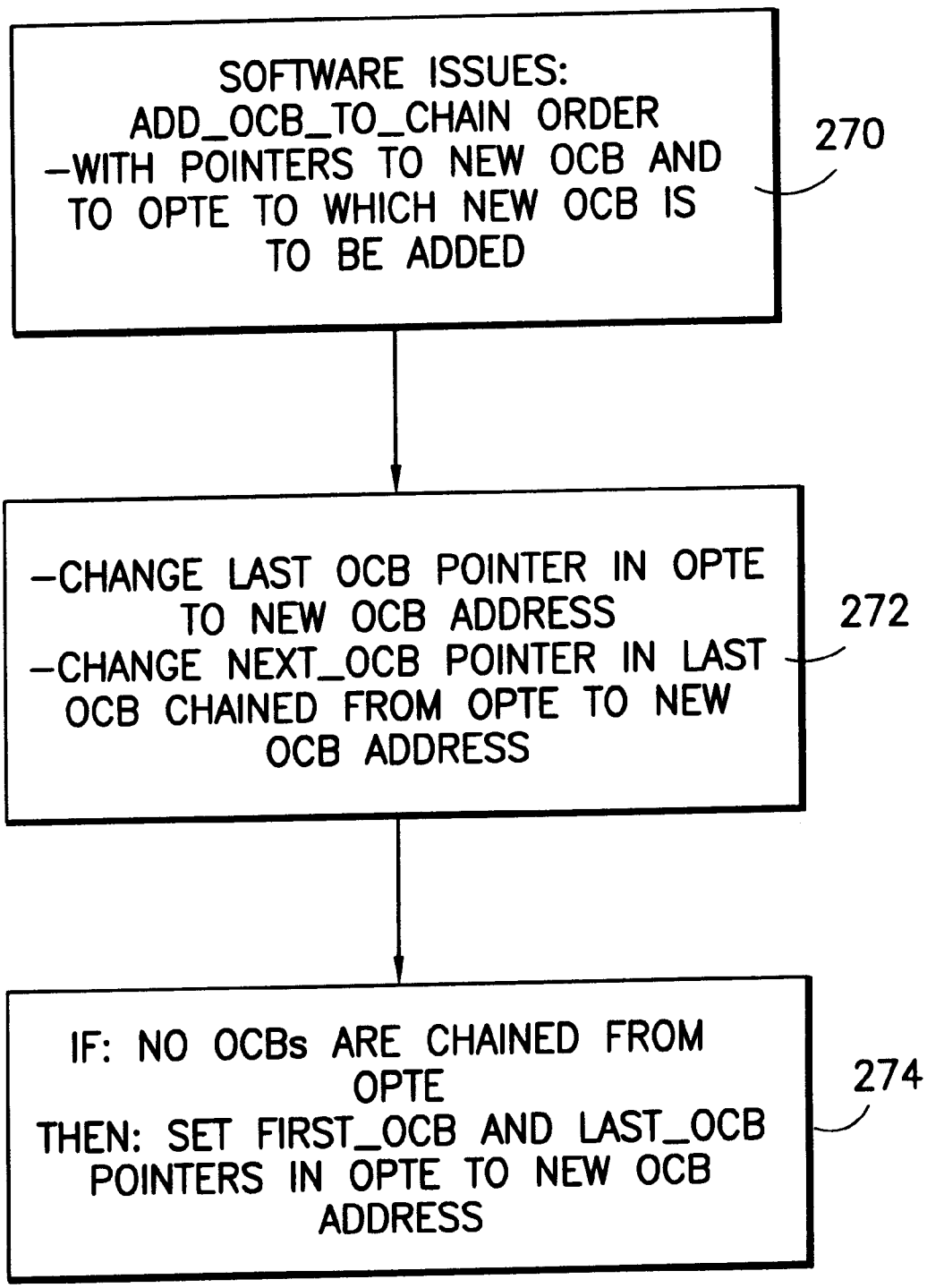
FIG. 9 is a logic flow diagram illustrating a procedure for adding a subtask to a task while the task is in the process of being executed.

As indicated above, when a Ready Port Order is issued from an OPTE, software is prevented from altering the OPTE. However, even though an OPTE is subject to a Ready Port Order, its task can be supplemented by the addition of further chained BCBs. That procedure enables that function is shown in FIG. 9 and commences with software issuing an "Add OCB to Chain" Order. That Order includes pointers to a new OCB and to the OPTE to which the new OCB is to be added (box 270). In response to the Order, output port state logic 60 changes the value of a last OCB pointer in the OPTE to the address of the new OCB. Further, the next OCB pointer in the last OCB chained from the OPTE is altered to indicate the new OCB's address (box 272). If no OCBs are chained from the OPTE, then the first OCB and last OCB pointers in the OPTE are set equal to the new OCB address (box 274). In this manner, an executing task can be supplemented through the vehicle of additional chained OCBs, without requiring that the executing task be discontinued or otherwise interrupted. When an OCB is added to the chain, software reissues the Ready order to account for the case in which the OCB completes before the order is issued.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for controlling execution of priority ordered tasks in a data processing system, said data processing system including a software-controlled processor and a hardware-configured queue-controller, said queue-controller comprising a plurality of priority-ordered queue means, each said queue means for listing tasks having an assigned priority equal to a priority order assigned to said queue means, said queue-controller responding to a processor generated order to queue a first task for execution, by performing a method comprising the steps of:

listing said first task on a first queue means having an assigned priority that is equal to a priority of said first task;

if a second task is listed on a queue means having a higher assigned priority, attempting execution of said second task before execution of said first task;

if no tasks are listed on queue means having a higher assigned priority than said first queue means, attempting execution of a first listed task in said first queue means;

upon completion of execution of said first listed task or in an event of a failure of said first listed task to complete, attempting execution of a further task on said first queue means only if another order has not been issued to place a task on a queue means having a higher assigned priority and if said first listed task failed to complete, causing said first listed task to become a last listed task on said first queue means; and if a task comprises a plurality of chained subtasks, attempting execution of each subtask of said task in response to said processor generated order, and if execution of any said subtask does not complete, attempting execution of another task in lieu of a subtask chained to said subtask that did not complete.

2. The method as recited in claim 1, further comprising the steps of:

upon incomplete execution of a subtask, storing a record which enables a last subtask of said task which successfully executed to be later determined; and upon a next attempt to execute said task whose subtask did not complete, employing said record and commencing execution of a subtask chained from said subtask which successfully executed, whereby all subtasks of said task are executed in a chaining order, even if a sequence of execution thereof is interrupted.

3. The method as recited in claim 1, comprising the added step of:

continuing attempts at execution of tasks listed on said queue means until all tasks on all queue means have been executed.

4. A data processing system for controlling execution of priority ordered tasks comprising:

processor means for issuing, under software control, ready orders to place priority ordered tasks on priority ordered queue means;

queue controller hardware means including a plurality of priority ordered queue means, each queue means comprising a plurality of registers for registering common priority task names that are ready for execution, each queue means registering only names of tasks that have a common priority order, said queue controller hardware means responsive to a ready order to (i) list a first task name designated by said ready order on a first queue means having a designated priority order equal to a priority order assigned to said task name and (ii) if another task name is listed on a queue means having a higher assigned priority order than a priority order of said first task, executing said another task before said first task, said queue controller hardware means responding to a ready order to attempt execution of at least one task on an atomic basis that is not interruptable by a software controlled action of said processor;

said queue controller hardware means attempting execution of a first listed task on said first queue means if no task names are listed on queue means having a higher assigned priority than said first queue means; and upon completion of execution of said first listed task or if said first listed task fails to complete, said queue controller hardware means attempting execution of a further task on said first queue means only if another order has not been issued to place a task on a queue means having a higher assigned priority and if said first listed task failed to complete, causing said first listed task to become a last listed task on said first queue means; and wherein if a task comprises a plurality of chained subtasks, said queue controller hardware means attempts execution of each subtask of a task in response to said processor generated order, and if execution of any said subtask does not complete, attempts execution of another task in lieu of said subtask chained to said subtask that did not complete.

5. The data processing system as recited in claim 4, wherein, upon non-completion of execution of a subtask, said queue controller hardware means causes storage of a record which enables a last subtask of said task which successfully executed to be later determined, and upon a next attempt to execute said task whose subtask did not complete, employs said record and commences execution of a subtask chained from said subtask which successfully executed, whereby all subtasks of said task are executed in a chaining order, even if a sequence of execution thereof is interrupted.

\* \* \* \* \*